US009467037B2

United States Patent
Kamiya et al.

(10) Patent No.: US 9,467,037 B2
(45) Date of Patent: Oct. 11, 2016

(54) ELECTRIC POWER TOOL HAVING A CONDUCTIVE ELASTIC BODY CONNECTED TO A YOKE

(75) Inventors: Shingo Kamiya, Anjo (JP); Junichi Nishikimi, Anjo (JP); Yoshifumi Morita, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 552 days.

(21) Appl. No.: 13/983,707

(22) PCT Filed: Jan. 24, 2012

(86) PCT No.: PCT/JP2012/051415
§ 371 (c)(1),
(2), (4) Date: Aug. 23, 2013

(87) PCT Pub. No.: WO2012/117769
PCT Pub. Date: Sep. 7, 2012

(65) Prior Publication Data
US 2013/0328460 A1    Dec. 12, 2013

(30) Foreign Application Priority Data

Feb. 28, 2011    (JP) .................................. 2011-041437

(51) Int. Cl.
| H02K 57/00 | (2006.01) |
| H02K 99/00 | (2014.01) |
| H02K 11/02 | (2016.01) |
| H02P 7/29 | (2016.01) |
| B25F 5/00 | (2006.01) |

(52) U.S. Cl.
CPC ............. *H02K 57/006* (2013.01); *B25F 5/006* (2013.01); *B25F 5/008* (2013.01); *H02K 11/024* (2013.01); *H02K 11/026* (2013.01); *H02K 11/33* (2016.01); *H02K 11/40* (2016.01); *H02P 7/29* (2013.01)

(58) Field of Classification Search
CPC ........... H02K 57/006; H02K 11/0073; H02K 11/024; H02K 11/026; B25F 5/006
USPC .......... 310/47, 68 R, 68 B, 216.001–216.137
See application file for complete search history.

(56) References Cited

U.S. PATENT DOCUMENTS

| 5,796,203 A * | 8/1998 | Wang ................. H01R 13/2414 310/220 |
| 7,323,796 B2 * | 1/2008 | Oomori .................... H02K 9/06 310/239 |
| 2010/0224497 A1 * | 9/2010 | Livshits .................. C25C 7/002 205/82 |

FOREIGN PATENT DOCUMENTS

| JP | A-58-10471 | 1/1983 |
| JP | U-62-101365 | 6/1987 |
| JP | A-7-322569 | 12/1995 |
| JP | A-11-333760 | 12/1999 |
| JP | A-2006-62038 | 3/2006 |
| JP | A-2008-260103 | 10/2008 |

OTHER PUBLICATIONS

Mar. 6, 2012 International Search Report issued in International Application No. PCT/JP2012/051415 (with translation).

* cited by examiner

*Primary Examiner* — Thanh Truong
*Assistant Examiner* — Thomas Wittenschlaeger
(74) *Attorney, Agent, or Firm* — Oliff PLC

(57) ABSTRACT

An electric power tool of an embodiment of the present invention uses a motor provided with a yoke as a drive source, and is configured such that an end portion of an electric component mounted on a drive circuit of the motor is electrically connected to the yoke of the motor through a conductive elastic body.

6 Claims, 4 Drawing Sheets

ELECTRIC POWER TOOL HAVING A CONDUCTIVE ELASTIC BODY CONNECTED TO A YOKE

BACKGROUND OF THE INVENTION

1. Field of the Invention

The present invention relates to an electric power tool provided with a yoke as a drive source.

2. Description of the Related Art

As a measure for suppressing noise produced in an electric power tool, a neutral line of a noise-protection capacitor is connected to a yoke of a motor, as shown in Japanese Laid-Open Utility Model Publication No. S62-101365.

That is, the yoke itself has a low impedance, and thus noise emitted from the electric power tool outwardly can be suppressed by inducing noise current to the yoke via the neutral line of the capacitor and making a loop smaller in which noise current flows.

In the electric power tool in Japanese Laid-Open Utility Model Publication No, S62-101365, the neutral line of the noise-protection capacitor is electrically connected to the yoke of the motor by pressing a terminal provided in the neutral line of the noise-protection capacitor toward the yoke of the motor by use of spring force.

However, in a construction in which a part of the noise-protection capacitor is electrically connected to the yoke of the motor by use of the neutral line, the terminal, and the spring etc., it is necessary to create storage space for housing wires and the spring etc. within the housing of the electric power tool.

Further, the terminal of the neutral line is configured to press the yoke of the motor by use of the spring force, and thus vibration of the electric power tool can, over time, cause contact failure.

Thus, there is a need in the art to connect an end portion of an electric component to the yoke of the motor by a space-saving and vibration-proof member.

SUMMARY OF THE INVENTION

One embodiement is an electric power tool that uses a motor provided with a yoke as a drive source. An end portion of an electric component mounted on a drive circuit of the motor may be electrically connected to the yoke of the motor through a conductive elastic body.

According to one embodiment, the conductive elastic body can be electrically connected to the yoke of the motor by inserting the conductive elastic body between the end portion of the electric component and the yoke of the motor. As compared to a construction in which the electric component is electrically connected to the yoke of the motor by use of lead wires, terminals, and the spring etc., the electric power tool of the embodiment will be advantageous in terms of space, Further, the electric power tool of this embodiment can prevent contact failure between the electric component and the yoke of the motor caused by vibration of the electric power tool.

According to another embodiment, a thickness size of the elastic body where external force is not applied to the elastic body is configured to be larger than a gap between the end portion of the electric component and the yoke of the motor.

Because of this, it is ensured that the end portion of the electric component is electrically connected to the yoke of the motor by inserting the elastic body into the gap between the end portion of the electric component and the yoke of the motor.

According to another embodiment, the elastic body includes an elastic main body and a conductive cloth that covers the elastic main body.

Because of this, deformation amount can be widely adjusted by changing the material of the elastic main body etc.

According to another embodiment, the elastic body is a conductive cloth that is folded and piled up.

In this way, the configuration is simple and thus the invention will be advantageous in terms of cost.

According to another embodiement, the electric component is an FET and the end portion of the electric component is a heatsink of the FET.

According to the above embodiements, the end portion of the electric component can be electrically connected to the yoke of the motor by the vibration-proof configuration.

DETAILED DESCRIPTION FO THE INVENTION (Embodiment 1)

An explanation about an embodiment 1 of the present invention will be described below with reference to FIG. 1 to FIG. 6. An electric power tool according to an embodiment of the present invention may be a battery-operated hammer drill that is provided with a direct-current motor as a power source.

<Outline of the Electric Power Tool>

Figure 1:
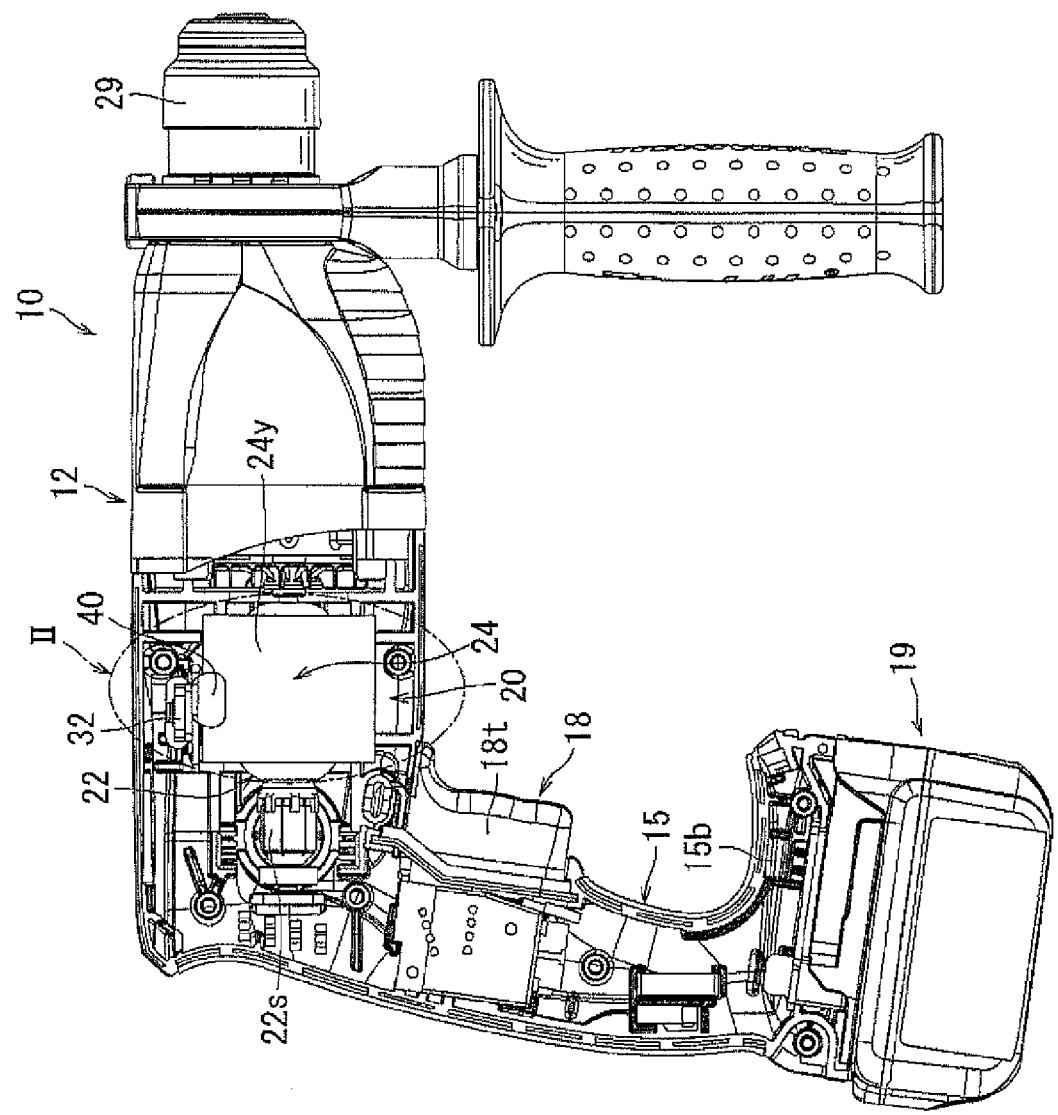
FIG. 1 is a partially cutout side view of an electric power tool according to an embodiment 1 of the present invention.
Figure 2:
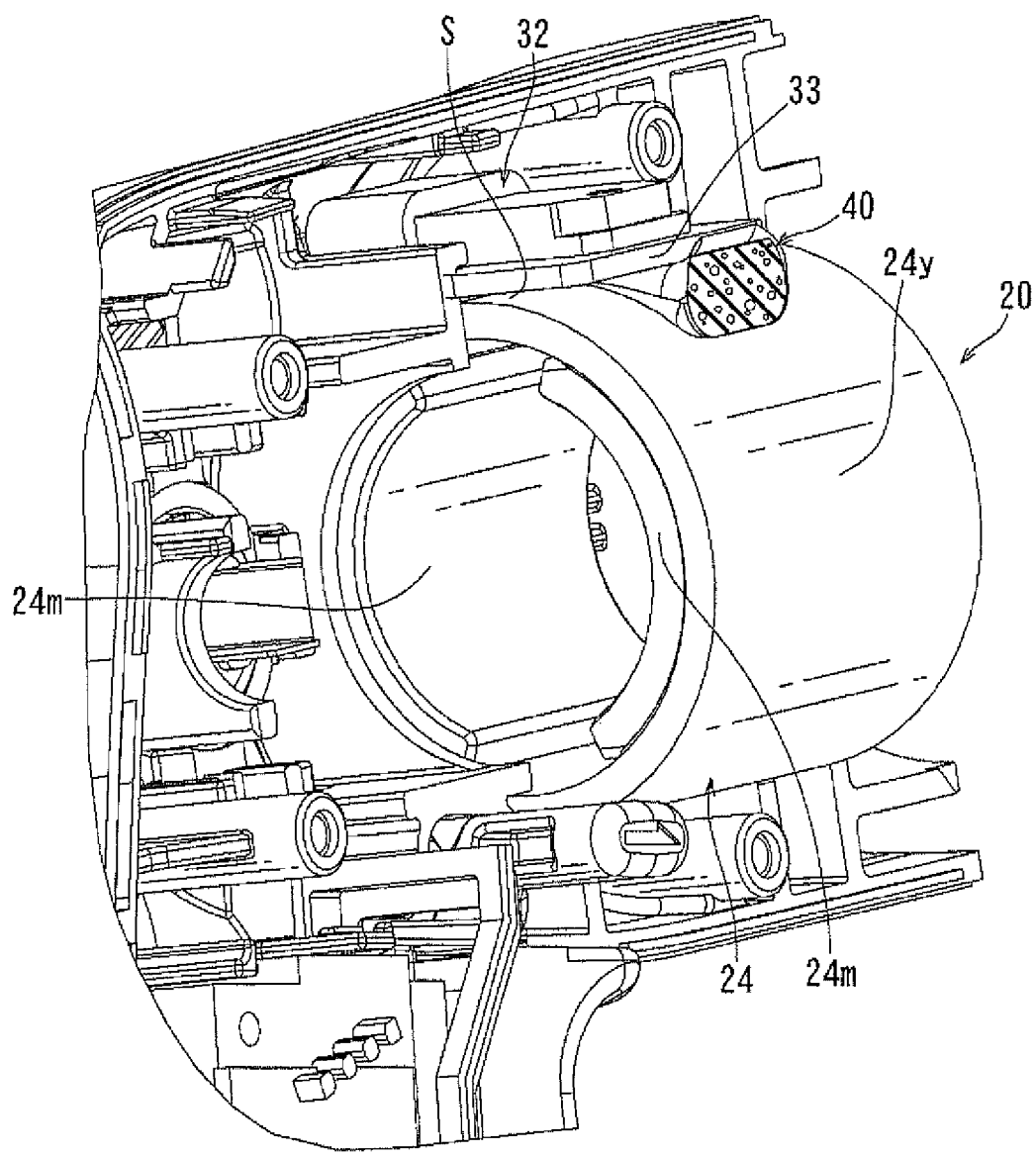
FIG. 2 is an enlarged perspective view of a portion indicated by an arrow II in FIG. 1.

The hammer drill 10 (hereinafter referred to as the electric power tool 10) includes a tubular housing main body 12 and a handle part 15 that is formed so as to protrude from a lower part of a rear portion of the housing main body 12, as shown in FIG. 1.

A direct-current motor 20 (hereinafter referred to as the motor 20) is housed in the rear portion of the housing main body 12, and a gear mechanism (not shown) that increases the rotational force of the motor 20 is housed in front of the motor 20. Further, an output shaft of the gear mechanism is linked to a tool applied part 29 that is placed at the tip of the housing main body 12.

Further, at a base end portion, there is provided a variable speed switch 18 having a trigger 18$t$ that can be pulled by a finger of a user. And, at the tip (bottom part) of the handle part 15, there is provided a battery connection part 15$b$ configured to be able to be connected to a battery 19.

<About the Motor 20 and the Motor Drive Circuit 30>

The motor 20 includes an armature 22 (rotor 22) having a commutator 22$s$, a cylindrical yoke 24$y$ and a permanent magnet 24m (refer to FIG. 2), and a stator having a brush 25 (refer to FIG. 3), as shown in FIG. 1. The armature 22 is not shown in FIG. 2.

Figure 3:
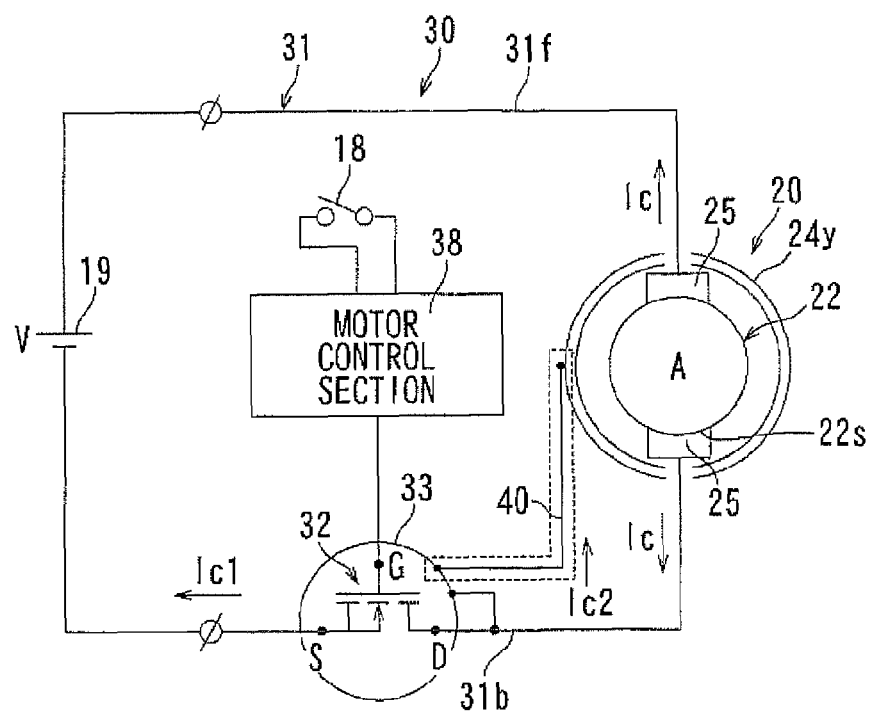
FIG. 3 is a schematic view showing a motor drive circuit of the electric power tool.

The motor 20 is configured to be driven by a motor drive circuit 30, as shown in FIG. 3. The motor drive circuit 30 includes a FET 32 that adjusts the electric power supplied to the armature 22 of the motor 20 (winding wires of the armature (not shown)), and a motor control section 38 that controls the FET 32 via a signal from the variable speed switch 18. Accordingly, electric power supplied from the battery 19 to the motor can be adjusted through pressing of the trigger 18t of the variable speed switch 18. In this way, the rotational speed of the electric power tool 10 can be controlled.

<About a Measure against Noise from the Electric Power Tool 10>

Since the motor 20 includes the commutator 22s and the brush 25 as described above, noise is generated by slide movement of the commutator 22s with respect to the brush 25 at the time of driving the motor 20. As shown in FIG. 3, noise (common mode noise) is generated such that noise current Ic flows from the motor 20, which is a noise source, toward a power supply (the battery 19) through an outward path 31f and a return path 31b of a power line 31 of the motor drive circuit 30.

In the electric power tool 10 according to an embodiment the present invention, a part Ic2 of the noise current Ic that flows toward the battery 19 is urged to the yoke 24y of the motor 20 and a loop in which noise current flows is made smaller, and thus noise emitted from the electric power tool 10 is reduced. In order to do this, a heatsink 33 of the FET 32 that is electrically connected to the return path 31b of the power line 31 is electrically connected to the yoke 24y of the motor 20 through a conductive elastic body 40.

As described above, the yoke 24y has a low impedance, and thus the part Ic2 of the noise current Ic can be urged to the yoke 24y through the elastic body 40.

<About the Elastic Body 40>

Figure 4:
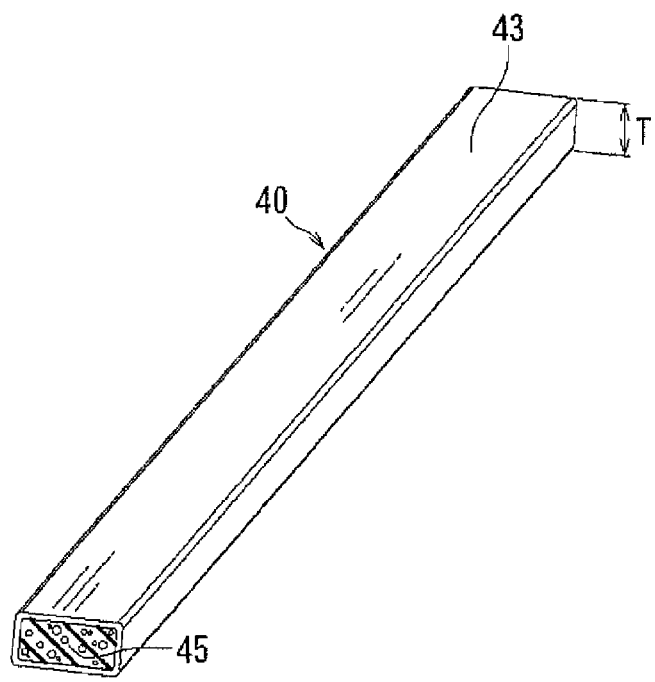
FIG. 4 is a perspective view showing a conductive elastic body that is used in the electric power tool.

As shown in FIG. 4, the elastic body 40 includes an elastic main body 45 having a sponge that is formed in a band plate shape, and a conductive cloth 43 that covers the elastic main body 45,. The conductive cloth 43 is formed, for example, by weaving resin fiber plated by conductive metal in a cloth shape.

Here, a thickness size T of the elastic body 40 is configured to be sufficiently larger than that of a gap between the heatsink 33 of the FET 32 that makes up the motor drive circuit 30 and the yoke 24y of the motor 20.

Due to this, the elastic body 40 is disposed so as to extend in a circumferential direction along an outer periphery of the yoke 24y of the motor 20. The elastic body 40 is inserted between the yoke 24y and the heatsink 33 of the FET 32, and thus the yoke 24y can be electrically connected to the heatsink 33.

That is, the FET 32 corresponds to an electric component of an embodiment of present invention and the heatsink 33 of the FET 32 corresponds to an end portion of the electric component of the present invention.

<Advantage of the Electric Power Tool 10 According to the Present Embodiment>

According to the electric power tool 10 of the present embodiment, by inserting the conductive elastic body 40 between the heatsink 33 of the FET 32 and the yoke 24y of the motor 20, the yoke 24y is electrically connected to the elastic body 40. Compared to the prior art construction in which the electrical component (noise-protection capacitor) is connected to the yoke of the motor by use of lead wires, the terminal, and the spring etc., the present embodiment will be advantageous in terms of space. Further, the present embodiment can prevent contact failure between the heatsink 33 of the FET 32 and the yoke 24y of the motor 20 caused by vibration of the electric power tool 10.

Further, the thickness size T of the elastic body 40 in a condition where external force is not applied to the elastic body 40 is configured to be larger than the gap between the heatsink 33 of the FET 32 and the yoke 24y of the motor 20. Because of this, it is ensured that the heatsink 33 of the FET 32 is electrically connected to the yoke 24y of the motor 20 by inserting the elastic body 40 between the heatsink 33 of the FET 32 and the yoke 24y of the motor 20.

Further, the elastic body 40 may include the elastic main body 45 and the conductive cloth 43 that covers the elastic main body 45, and thus deformation amount of the elastic body 40 can be widely adjusted by changing material of the elastic main body 45 etc.

<Modification>

Figure 5:
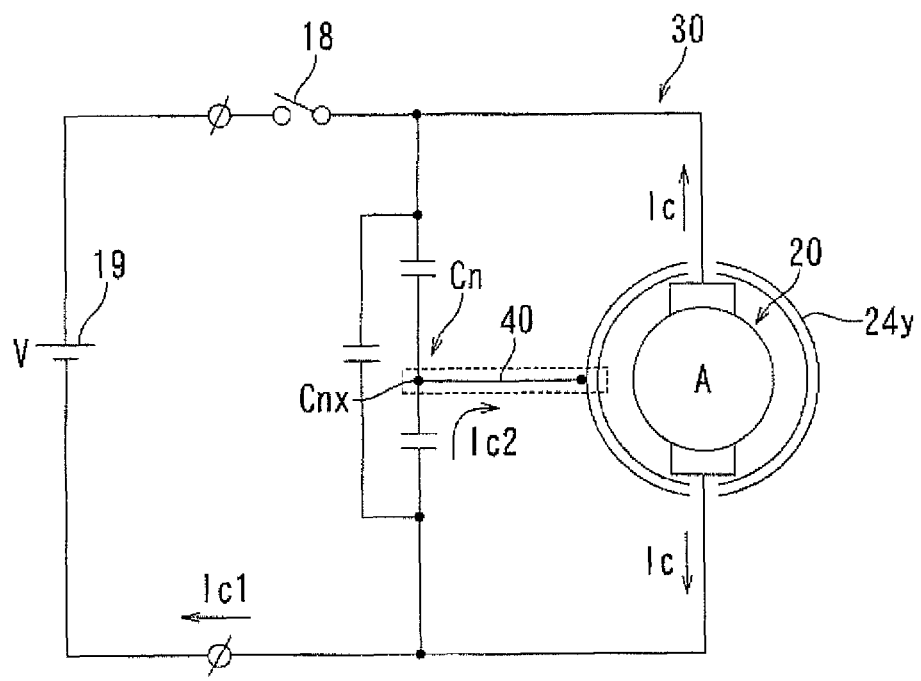
FIG. 5 is a schematic view showing a motor drive circuit of the electric power tool according to a modified example.

Here, the present invention is not limited to the above embodiment and various modifications can be made without departing from the scope of the invention. The above embodiment shows that the elastic body 40 is inserted between the heatsink 33 of the FET 32 and the yoke 24y of the motor 20. However, as shown in FIG. 5, in a motor drive circuit 30 in which a noise-protection capacitor Cn is provided, it is possible that by inserting the elastic body 40 between a neutral terminal Cnx of the noise-protection capacitor Cn and the yoke 24y of the motor 20, the neutral terminal Cnx may be electrically connected to the yoke 24y.

Figure 6:
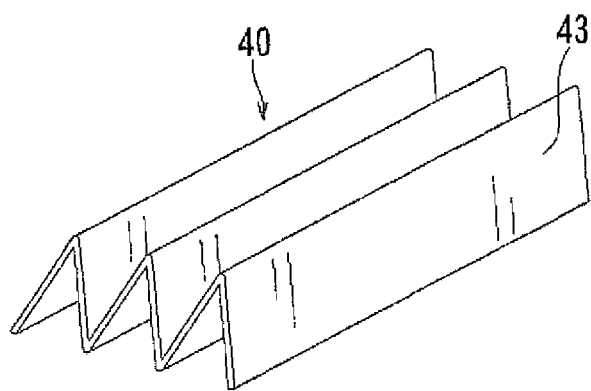
FIG. 6 is a perspective view showing a conductive elastic body according to a modified example.

Further, the above embodiment shows that the elastic body 40 includes the elastic main body 45 and the conductive cloth 43. However, as shown in FIG. 6, a conductive cloth 43 that is folded and piled up can be used as the elastic body 40. This will enable the construction of the elastic body 40 to become simple and will be advantageous in terms of cost.

Further, the present embodiment shows the hammer drill as the electric power tool 10. However, any electric power tools that use the motor provided with the yoke 24y can be applied to embodiments of the present invention.

Explanation of Symbols

20 . . . motor
22s . . . commutator
24y . . . yoke
25 . . . brush
32 . . . FET
33 . . . heatsink
40 . . . elastic body
43 . . . conductive cloth
45 . . . elastic main body
S . . . gap

What is claimed is:

1. An electric power tool comprising;
a motor that is a drive source and is provided with a yoke;
an electric component that is mounted on a drive circuit of the motor; and
a conductive elastic body that is inserted between an end portion of the electric component and the yoke such that the end portion of the electric component and the yoke are electrically connected by the conductive elastic body;
wherein the conductive elastic body includes an elastic main body and a conductive cloth that covers the elastic main body, the elastic body being formed in a band plate shape, and the conducting cloth covering an entirety of an outer surface of the elastic main body.

2. The electric power tool according to claim 1, wherein when external force is not applied to the conductive elastic body, a thickness of the conductive elastic body is configured to be larger than a gap between the end portion of the electric component and the yoke of the motor.

3. The electric power tool according to claim 1, wherein the electric component is a field-effect transistor (FET) and the end portion of the electric component is a heatsink of the FET.

4. The electric power tool according to claim 1, wherein the conductive cloth is made of resin fiber plated by conducted metal in a cloth shape.

5. The electric power tool according to claim 1, wherein
the conductive elastic body is disposed so as to extend in a circumferential direction of the yoke along an outer peripheral of the yoke, and
the conductive elastic body is inserted between the end portion of the electric component and the outer peripheral of the yoke, thereby the end portion of the electric component and the yoke are electrically connected.

6. The electric power tool according to claim 1, wherein the conductive elastic body includes an upper surface and a lower surface, both the upper surface and the lower surface extending in a longitudinal direction of the conductive elastic body, and
the upper surface and the lower surface are sandwiched by the end portion of the electric component and the yoke.

* * * * *